United States Patent [19]

Miller

[11] Patent Number: 4,945,404

[45] Date of Patent: Jul. 31, 1990

[54] VIDEO COMMUNICATION SYSTEM AND PHASE OR FREQUENCY MODULATOR INCLUDED THEREIN

[75] Inventor: Gershon Miller, Rehovot, Israel

[73] Assignee: Medaon Ltd., Jerusalem, Israel

[21] Appl. No.: 191,103

[22] Filed: May 6, 1988

[30] Foreign Application Priority Data

May 15, 1987 [IL] Israel .......................................... 82539

[51] Int. Cl.⁵ ........................... H04N 7/04; H04N 7/14
[52] U.S. Cl. ......................................... 358/141; 358/85;
358/469; 358/134
[58] Field of Search ........................ 358/12, 23, 85, 141,
358/142, 160, 209, 281, 134, 140, 455, 469;
375/22, 23, 67

[56] References Cited

U.S. PATENT DOCUMENTS

| | | | |
|---|---|---|---|
| 3,898,589 | 8/1975 | Tustison | 375/23 |
| 4,057,836 | 11/1977 | Munsey | 358/134 |
| 4,059,806 | 11/1977 | Vagt, Jr. | 375/23 |
| 4,400,717 | 8/1983 | Southworth et al. | 358/141 |
| 4,739,413 | 4/1988 | Meyer | 358/141 |

FOREIGN PATENT DOCUMENTS 145521 12/1978 Japan ........................................ 358/13

Primary Examiner—John W. Shepperd
Assistant Examiner—Michael D. Parker
Attorney, Agent, or Firm—Benjamin J. Barish

[57] ABSTRACT

A video communication system for transmitting still pictures of a scene during periodic intervals comprises a T.V. camera producing video analog signals of the scene to be transmitted, an analog-to-digital converter converting the video analog signals to pixel digital signals representing the gray level of each pixel in the scene, a memory for storing the pixel gray levels, and a phase modulator for modulating a carrier wave by the pixel gray levels from the memory.

19 Claims, 3 Drawing Sheets

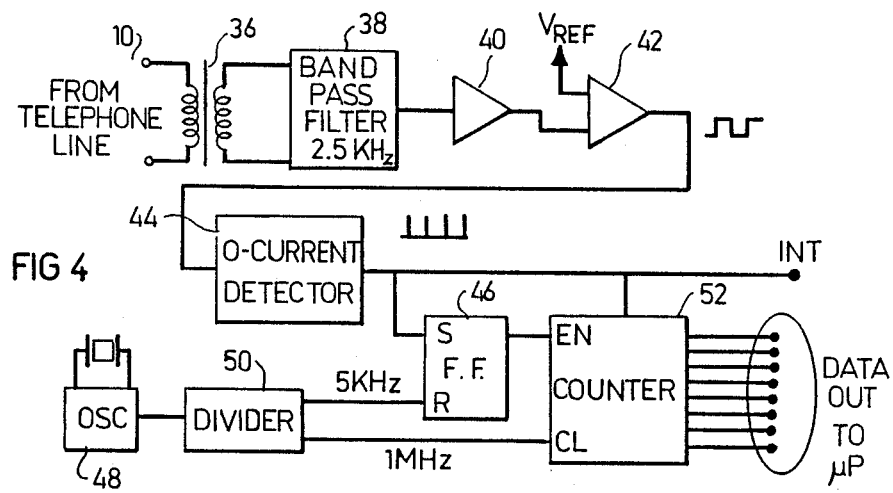
FIG 4
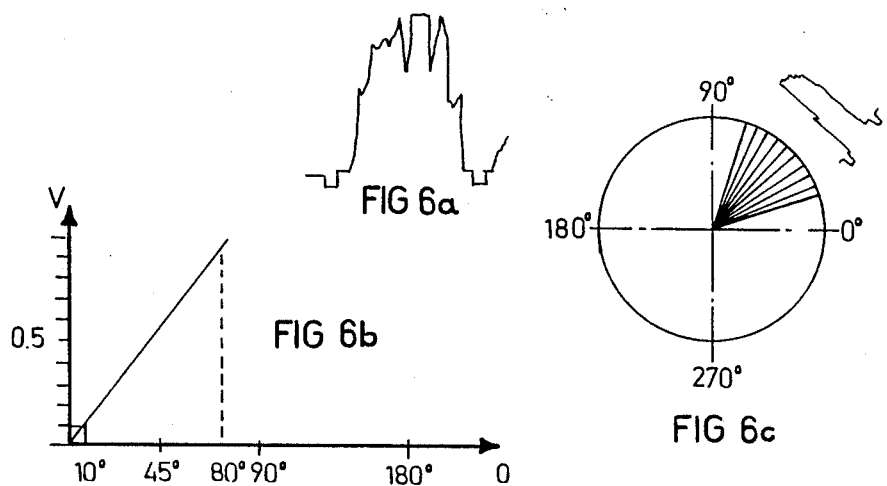
FIG 6a
FIG 6b
FIG 6c
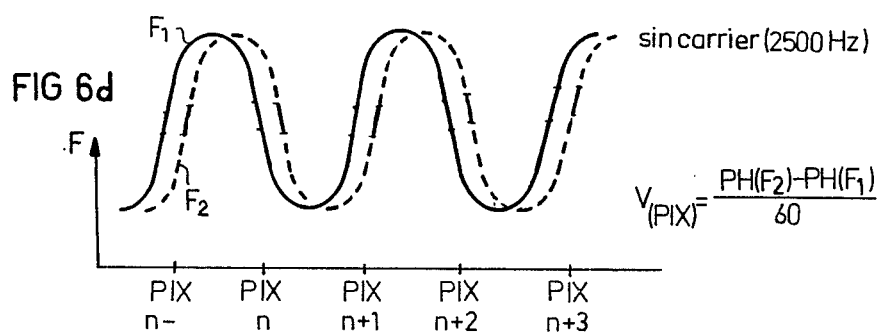
FIG 6d
sin carrier (2500 Hz)
$$V_{(PIX)} = \frac{PH(F_2) - PH(F_1)}{60}$$

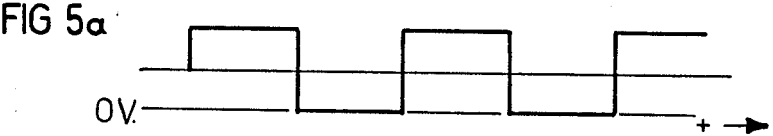
FIG 5a
FIG 5b
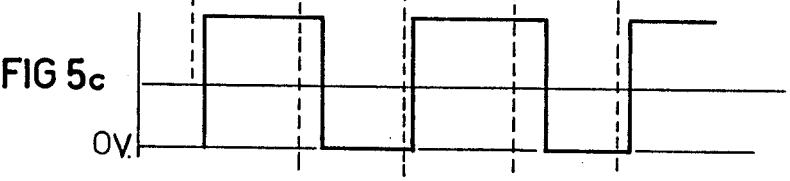
FIG 5c
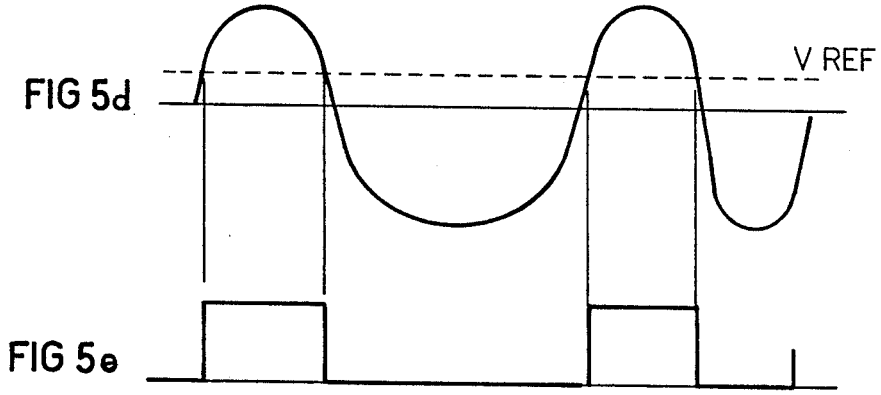
FIG 5d
FIG 5e
FIG 5f
FIG 5g
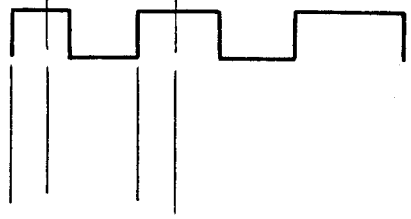
FIG 5h

VIDEO COMMUNICATION SYSTEM AND PHASE OR FREQUENCY MODULATOR INCLUDED THEREIN

BACKGROUND OF THE INVENTION

The present invention relates to a video communication system and also to a phase or frequency modulator included in such system. The invention is particularly applicable in "freeze frame" transmission of video signals, e.g., for making conference telephone calls or for monitoring security areas, and therefore the invention is described below with respect to this application.

The existing "freeze frame" video communication systems commonly include a TV camera producing a video analog output of the scene to be transmitted, an analog-to-digital converter for digitizing the analog signals, a memory, a digital compression unit, and a modem (modulator-demodulator) for modulating a carrier wave signal before transmission via the telephone line or radio to a receiver. The receiver in such systems includes another modem, a decompression unit, a memory, and an digital-to-analog converter for reconverting the digital signals back to analog signals before fed to a TV display unit. Such systems, however, are quite costly particularly because of the need for a digital-compression unit in the transmitter, and a digital-decompression unit in the receiver.

BRIEF SUMMARY OF THE INVENTION

One object of the present invention is to provide a novel video communication system for transmitting and receiving still pictures. Another object of the invention is to provide a novel phase or frequency modulator particularly useful in the above video communication system.

According to the present invention, there is provided a video communication system for transmitting still pictures of a scene during periodic intervals each of a predetermined duration, comprising: a T.V. camera producing video analog signals of the scene to be transmitted; an analog-to-digital converter converting the video analog signals to pixel digital signals representing the gray level of each pixel in the scene; a memory for storing the pixel gray levels for the predetermined duration; means for generating a carrier wave; and a modulator for modulating the carrier wave by the pixel gray levels from the memory.

In the preferred embodiment of the invention described below, the modulator is a phase modulator which shifts the cross-over point of the carrier wave no more than 180° preferably from 10°–80° in the described preferred embodiment, according to the gray level of the respective pixel in the picture. More particularly, the converter converts the stored pixel gray levels to a series of signal pulses each having a duration corresponding to the instantaneous value of the stored pixel gray level; and the modulator changes the cross-over point of the carrier wave according to the duration of the signal pulses, to thereby modulate the carrier wave according to the instantaneous value of the stored pixel gray level.

In the described preferred embodiment, the carrier wave is a square-wave.

According to another aspect of the invention, there is provided a phase modulator for modulating a carrier wave by video analog signals derived from a picture and converted to pixel digital signals representing the gray levels of the picture elements in the picture, the modulator comprising: generator means generating a carrier wave; a converter converting the pixel digital signals to a series of signal pulses each having a duration corresponding to the instantaneous value of the video analog signals; and modulator means changing the cross-over point of the carrier wave no more than 180° according to the duration of the signal pulses, to thereby modulate the carrier wave according to the instantaneous value of the video analog signal.

The novel video communication system may use a standard closed-circuit TV (CCTV) camera and monitor, for transmitting and receiving "freeze frames", e.g., one frame every twenty seconds. The video signals may be transmitted over a half-duplex two-wire line or via radio. The novel modulator effects fast modulation, e.g., 30,000 BPS (Bits Per Second), as compared to the existing systems which are of relatively slower speed e.g., 9,600 BPS. While the resolution in the system of the present invention is somewhat poorer than the existing systems, it is generally suitable for "freeze frame" television communication systems since the eye is adapted to filter out the noise in the picture (the noise appearing as "snow"), and "drifts" in the oscillations of the modem, the drifts appearing as shadows on a part of the picture.

Further features and advantages of the invention will be apparent from the description below.

BRIEF DESCRIPTION OF THE DRAWINGS

The invention is herein described, by way of example only, with reference to the accompanying drawings wherein:

FIG. 4 is a block diagram illustrating the demodulator in the receiver of FIG. 2;

FIGS. 5A–5H illustrate a plurality of waveforms helpful in understanding the operation of the modulator and demodulator of FIGS. 3 and 4; and FIGS. 6a–6d are diagrams further helpful in understanding the operation of the modulator and demodulator in FIGS. 3 and 4, respectively.

DESCRIPTION OF A PREFERRED EMBODIMENT

Figure 1:
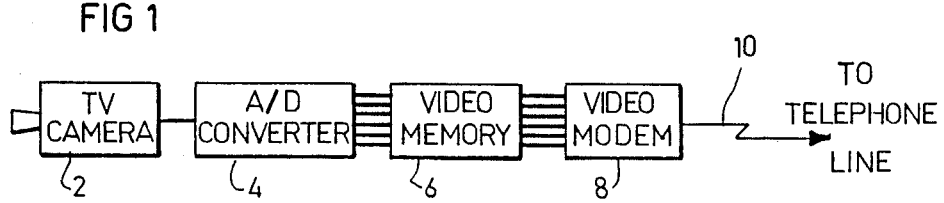
FIG. 1 is a block diagram illustrating the transmitter in a video communications system constructed in accordance with the present invention.

With reference to FIG. 1, there is illustrated the transmitter end of a video communication system for transmitting still pictures during periodic intervals of a predetermined duration, for example one frame each 20 seconds. The transmitter illustrated in FIG. 1 comprises a TV camera 2 producing video analog output signals of the scene to be transmitted; an analog-to-digital converter 4 converting the analog output signals to pixel digital signals representing the gray level of each pixel in the scene; a video memory 6 storing the pixel digital values for the predetermined duration, e.g., 20 seconds; and a video modulator 8 modulating a carrier according to the pixel digital value stored in the memory for transmission via a telephone line 10 (or via a radio link) to the receiver illustrated in FIG. 2. The receiver in FIG. 2 includes a video demodulator 12 which detects the pixel digital value used for modulating the carrier signal; a memory 14 storing the pixel digital values; a digital-to-analog converter 16 for converting the pixel digital values back to analog signals; and a TV display 18 utilizing the latter analog signals to reproduce the still picture for viewing.

Figure 2:
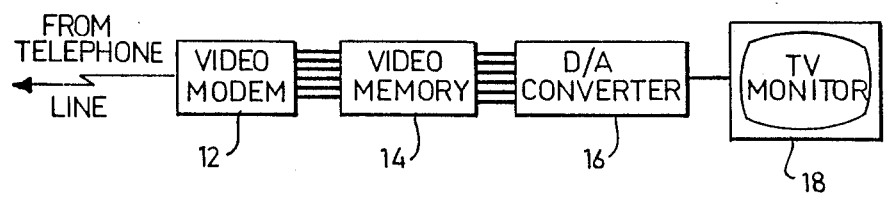
FIG. 2 is a block diagram illustrating the receiver in the video communication system of FIG. 1.

Except for the modulator unit 8 in FIG. 1 and the demodulator unit 12 in FIG. 2, all the units illustrated in FIGS. 1 and 2 may be standard commercial components, and therefore details of their construction and operation are not set forth herein. As one example, each TV frame may be divided into a matrix of 300×400 pixels (picture elements), each having any one of up to 64 gray levels (0=black, 63=white) which can be represented by 6 binary bits.

Figure 3:
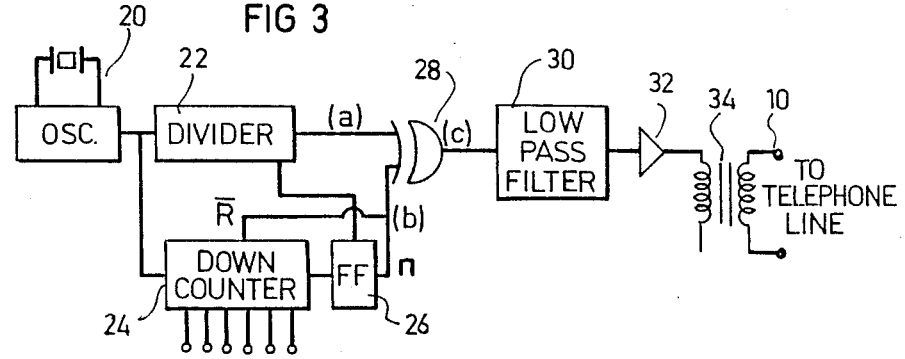
FIG. 3 is a block diagram illustrating the modulator in the transmitter of FIG. 1.

The modulator unit 8 in the transmitter of FIG. 1 is more particularly illustrated in FIG. 3. Briefly, it generates a square-wave carrier, converts the modulating electrical signal from the video memory 6 (FIG. 1) to signal pulses each having a duration corresponding to the instantaneous value of the modulating electrical signals (the stored pixel gray levels), and changes the cross-over point of each square half-wave according to the duration of the signal pulses, to thereby modulate the square-wave carrier according to the pixel digital values.

More particularly, as shown in FIG. 3, the modulator 8 comprises a local oscillator 20 which generates a high frequency square wave. This is converted by a divider 22 to a lower frequency square-wave, shown by waveform (a) in FIG. 5. As one example, oscillator 20 may operate at 1 MHz, and the square-wave signal output from divider 22 may be 2.5 KHz.

The gray level (0–63) of each pixel is inputted into a down-counter 24 via its 6-bit input. Counter 24 determines the time of loading the gray level value of the next pixel. Counter 24 is controlled by a flip-flop 26 which is actuated by the output of divider 22 to produce, for each digital signal, a pulse having a duration corresponding to the digital value of the respective pixel; More particularly, flip-flop 26 is initially in a reset condition (its output is "low"). Divider 22 outputs pulses to flip-flop 26 until the flip-flop is set (goes "high"), at which time it turns off the "Reset" terminal of the down-counter 24. The latter counter starts to count down until it reaches the gray level of the pixel value inputted into the down-counter. At that time, down-counter 24 resets flip-flop 26 (which goes "low"), and the flip-flop resets down-counter 24, preparatory for the next pixel. output of the flip-flop is illustrated by waveform (b), FIG. 5.

The latter pulses waveform (b), from flip-flop 26 are received together with the square-wave carrier from divider 22, in an exclusive-or circuit 28. This circuit increases the zero-current point of each square half-wave according to the duration of the pulse inputted from flip-flop 26, to thereby modulate the square-wave carrier, waveform (a), FIG. 5 according to the instantaneous pixel value waveform (b). The so-modulated carrier signal is illustrated by waveform (c), FIG. 5.

The modulated carrier signal is then fed through a low pass filter which removes the high-frequency harmonics, thereby producing a modulated carrier more closely resembling a sine wave. This signal is amplified in amplifier 32 and then applied to the telephone line via coupler 34.

As shown in FIG. 4 illustrating the receiver, the modulated carrier signal, received from telephone line 10 via coupler 36, is passed through a filter 38 tuned to the frequency of the carrier (2.5 KHz) in order to remove noise, and is then amplified in an amplifier 40. The amplified signal is fed to one input of a comparator 42, the other input receiving a reference signal, so as to produce at the output of the comparator a square wave signal, illustrated by waveform (e) FIG. 5, corresponding to the modulated square wave signal, waveform (c) FIG. 5, transmitted by the transmitter unit 8.

The modulated square-wave signal is then fed to a zero-current detector 44 which detects the cross-over point of each half-square wave to produce a pulse at each such cross-over point, as illustrated by waveform (f) FIG. 5. These pulses are used to set a flip-flop 46.

Flip-flop 46 is reset by pulses produced from a local oscillator 48 after passing through a divider 50. Oscillator 48 may operate at the same high frequency e.g., 1 MHz as oscillator 20 in the modulator of FIG. 3, but divider 50 reduces the frequency to 5 KHz, rather than to 2.5 KHz. In addition to providing the 5 KHz pulses to reset flip-flop 46, divider 50 also supplies 1 MHz pulses to clock a counter 52 connected to the output of flip-flop 46.

The 5 KHz pulses applied by divider 50 to flip-flop 46 are illustrated by waveform (g) in FIG. 5, and the output of the flip-flop is illustrated by waveform (h). It will thus be seen that waveform (h) outputted from the flip-flop is similar to the pulses illustrated by waveform (b) FIG. 5, in which the duration of each pulse corresponds to the gray level of the respective pixel. Counter 52 outputs the digital value representing the gray level of each such pixel. These digital values are applied to the TV monitor 18 (FIG. 2), thereby reproducing the original frame as transmitted by the TV camera 2 in the transmitter illustrated in FIG. 1.

FIG. 6a illustrates the video signal as originally received by the TV camera 2 in the transmitter. FIGS. 6b and 6c illustrate the phase shift produced in the carrier according to the gray levels of the pixel elements. It will be seen from FIGS. 6b and 6c that the 64 gray levels of the pixel elements produce no more than a 90° shift in the phase of the carrier wave, actually from 10°–80°. FIG. 6d illustrates the manner in which the carrier wave ($F_1$) is shifted in phase by the pixel values to produce the modulated carrier ($F_2$).

While the invention has been described with respect to one preferred embodiment, it will be appreciated that many variations, modifications and other applications of the invention may be made.

What is claimed is:

1. A video communication system for transmitting still pictures of a scene during periodic intervals each of a predetermined duration, comprising:

a T.V. camera producing video analog signals of the scene to be transmitted;

an analog-to-digital converter converting the video analog signals to pixel digital signals representing the gray level of each pixel in the scene;

a memory for storing said pixel gray levels for the predetermined duration;

generator means for generating a carrier wave;

and a modulator for modulating said carrier wave by said pixel gray levels from said memory;

said modulator being a phase modulator which shifts the cross-over point of the carrier wave no more than 180° according to the gray level of the respective pixel in said picture.

2. A video communication system for transmitting still pictures of a scene during periodic intervals each of a predetermined duration, comprising:
a T.V. camera producing video analog signals of the scene to be transmitted;
an analog-to-digital converter converting the video analog signals to pixel digital signals representing the gray level of each pixel in the scene;
a memory for storing said pixel gray levels for the predetermined duration;
generator means for generating a carrier wave;
and a modulator for modulating said carrier wave by said pixel gray levels from said memory;
said modulator comprising: a converter converting said stored pixel gray levels to a series of signal pulses each having a duration corresponding to the instantaneous value of the stored pixel gray level; said modulator changing the cross-over point of the carrier wave according to the duration of said signal pulses, to thereby modulate the carrier wave according to the instantaneous value of the stored pixel gray level.

3. The system according to claim 2, wherein said generator means generates a square-wave carrier wave.

4. The system according to claim 3, further including filter means for removing the high-frequency harmonics from the modulated carrier wave to produce a modulated carrier more closely resembling a sine wave.

5. The system according to claim 3, wherein said converter means comprises a counter counting the digital value of said stored pixel gray levels, and a flip-flop which is actuated to produce, for each stored pixel level, a signal pulse having a duration corresponding to the digital value of the respective stored pixel value.

6. The system according to claim 5, wherein said modulator means comprises an exclusive-or circuit which changes the cross-over point of each square half-wave according to the duration of the signal pulses.

7. The system according to claim 1, wherein said generator means comprises a local oscillator generating a high-frequency square wave, and a divider producing therefrom a lower-frequency square-wave carrier.

8. The system according to claim 7, wherein the frequency of the square-wave carrier is 2.5 KHz.

9. A video communications system according to claim 1, further including a receiver for receiving and reproducing said still pictures transmitted by the transmitter, said receiver comprising: a demodulator for detecting, from the modulated carrier signal, the pixel digital values used for modulating the carrier signal; a memory for storing said detected pixel digital values; a digital-to-analog converter for converting said pixel digital values to analog signals; and a T.V. display utilizing said latter analog signals to reproduce said still pictures.

10. The video communication system according to claim 9, wherein said demodulator comprises: a zero-current detector for detecting the cross-over point of each half-wave of the carrier signal and for generating a pulse corresponding thereto; a flip-flop controlled by the output of said zero-current detector; and a counter controlled by said flip-flop to output a digital value corresponding to the gray level the carrier and thereby corresponding to the video signals inputted into the modulator.

11. The video communication system according to claim 10, wherein said demodulator further includes a local oscillator, and a divider producing square waves having double the frequency of the square-wave carrier signal generated in the modulator, the square-waves produced in said demodulator being used to control the flip-flop and counter in said demodulator.

12. The video communication system according to claim 10, wherein said demodulator further comprises a comparator for converting the received modulated carrier signal to a modulated square-wave carrier signal before applied to said zero-current detector.

13. A phase modulator for modulating a carrier wave by video analog signals derived from a picture and converted to pixel digital signals representing the gray levels of the picture elements in the picture, said modulator comprising: generator means generating a carrier wave; a converter converting said pixel digital signals to a series of signal pulses each having a duration corresponding to the instantaneous value of the video analog signals; and modulator means changing the cross-over point of the carrier wave no more than 180° according to the duration of said signal pulses, to thereby modulate the carrier wave according to the instantaneous value of the video analog signal.

14. The phase modulator according to claim 13, wherein said generator means generates a square-wave carrier wave.

15. The phase modulator according to claim 13, further including filter means for removing the high-frequency harmonics from the modulated carrier wave to produce a modulated carrier more closely resembling a sine wave.

16. The phase modulator according to claim 15, wherein said converter comprises a counter counting the digital value of each of said pixel digital signals, and a flip-flop which is actuated to produce, for each pixel digital signal, a signal pulse having a duration corresponding to the digital value of the respective pixel digital signal.

17. The phase modulator according to claim 16, wherein said modulator means comprises an exclusive-or circuit which changes the cross-over point of each square half-wave according to the duration of the signal pulses.

18. The phase modulator according to claim 13, wherein said generator means comprises a local oscillator generating a high-frequency square wave, and a divider producing therefrom a lower-frequency square-wave carrier.

19. The phase modulator according to claim 18, wherein the frequency of the square-wave carrier is 2.5 KHz.

* * * * *